(12) United States Patent
Rao et al.

(10) Patent No.: US 9,767,067 B2
(45) Date of Patent: Sep. 19, 2017

(54) BASEBOARD MANAGEMENT SYSTEMS AND METHODS WITH DISTRIBUTED INTELLIGENCE FOR MULTI-NODE PLATFORMS

(71) Applicant: Dell Products, L.P., Round Rock, TX (US)

(72) Inventors: Balaji Bapu Gururaja Rao, Austin, TX (US); Elie Antoun Jreij, Pflugerville, TX (US); Timothy M. Lambert, Austin, TX (US); John R. Stuewe, Round Rock, TX (US); Shekar Babu Suryanarayana, Bangalore (IN); Paul W. Vancil, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 394 days.

(21) Appl. No.: 14/625,676

(22) Filed: Feb. 19, 2015

(65) Prior Publication Data

US 2016/0246754 A1    Aug. 25, 2016

(51) Int. Cl.
*G06F 13/42* (2006.01)
*G06F 15/78* (2006.01)
*G06F 13/10* (2006.01)
*G06F 13/40* (2006.01)
*G06F 15/16* (2006.01)

(52) U.S. Cl.
CPC ...... *G06F 13/4286* (2013.01); *G06F 13/4068* (2013.01); *G06F 15/161* (2013.01)

(58) Field of Classification Search
None
See application file for complete search history.

*Primary Examiner* — Farley Abad
*Assistant Examiner* — Dayton Lewis-Taylor
(74) *Attorney, Agent, or Firm* — Fogarty LLP (57) ABSTRACT

Baseboard management systems and methods with distributed intelligence for multi-node platforms. In an illustrative, non-limiting embodiment, an Information Handling System (IHS) may include a plurality of modules, each of the plurality of modules including a plurality of nodes, each of the plurality of nodes including a system-on-chip (SoC), each of the plurality of SoCs including an integrated management controller (iMC), each of the plurality of iMCs configured to implement a first intelligent platform management interface (IPMI) stack having a first architecture; and a plurality of baseboard management controllers (BMCs), each of the BMCs disposed on a corresponding one of the plurality of modules, each of the BMCs coupled to the plurality of iMCs on the corresponding one of the plurality of modules, each of the plurality of iMCs configured to implement a second IPMI stack having a second architecture different from the first architecture.

20 Claims, 6 Drawing Sheets

BASEBOARD MANAGEMENT SYSTEMS AND METHODS WITH DISTRIBUTED INTELLIGENCE FOR MULTI-NODE PLATFORMS

FIELD

This disclosure relates generally to computer systems, and more specifically, to baseboard management systems and methods with distributed intelligence for multi-node platforms.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and/or networking systems.

IHS platforms targeted at high-density, hyper-scale data centers are increasingly incorporating designs that include multiple processors on the same device. The advent of new highly integrated SOCs (System-on-Chips) server silicon designs based on licensed processing cores is fueling the introduction of these new IHS architectures—which are often referred to as multi-node servers or micro-servers.

As the inventors hereof have recognized, however, in a multi-node IHS, several server instances may be implemented on a single motherboard (or even on a single blade motherboard), therefore the system's management complexity is larger; that is, there are more "subsystems" to be managed per IHS. Even though each of these subsystems may be relatively small, users still expect each subsystem to have the same management capabilities that typically exist on a large-core/high-performance server. Accordingly, the inventors hereof have identified a need for baseboard management in multi-node IHS systems without increased cost, complexity, and/or without sacrificing certain desirable features.

SUMMARY

Embodiments of baseboard management systems and methods with distributed intelligence for multi-node platforms are described herein. In an illustrative, non-limiting embodiment, an Information Handling System (IHS) may include a plurality of modules, each of the plurality of modules including a plurality of nodes, each of the plurality of nodes including a system-on-chip (SoC), each of the plurality of SoCs including an integrated management controller (iMC), each of the plurality of iMCs configured to implement a first intelligent platform management interface (IPMI) stack having a first architecture; and a plurality of baseboard management controllers (BMCs), each of the BMCs disposed on a corresponding one of the plurality of modules, each of the BMCs coupled to the plurality of iMCs on the corresponding one of the plurality of modules, each of the plurality of iMCs configured to implement a second IPMI stack having a second architecture different from the first architecture.

The plurality of modules may include trays, blades, or sleds, and the IHS may include a chassis configured to receive the trays, blades, or sleds. Each of the plurality of SoCs may include a processor and a memory coupled to the processor.

Also, the first architecture may have a smaller number of components than the second architecture. For instance, the first architecture may include a sensor driver, a sensor monitor coupled to the sensor driver, and a first encapsulator coupled to the sensor driver, the first encapsulator configured to communicate sensor information to or from a corresponding BMC. The first encapsulator may include a Platform Level Data Model (PLDM)-to-management transport protocol mapper, a management transport protocol interface coupled to the PLDM-to-management transport protocol mapper, and an interconnect bus link coupled to the management transport protocol interface; and the interconnect bus link may be configured to communicate with the corresponding BMC. The first architecture may further include a host interface driver, a host interface message relay coupled to the host interface driver, and a second encapsulator coupled to the host interface message relay, the second encapsulator configured to communicate host interface information to or from the corresponding BMC. The first architecture may further include a universal asynchronous receiver/transmitter (UART) driver, a serial relay coupled to the UART driver, and a third encapsulator coupled to the serial relay, the third encapsulator configured to communicate UART information to or from the corresponding BMC.

The corresponding BMC may include a first decapsulator configured to configured to communicate sensor information to or from the iMC, a second decapsulator configured to configured to communicate host interface information to or from the iMC, and a third decapsulator configured to configured to communicate UART information to or from the iMC. The first, second, and third decapsulators may be each coupled to respective interfaces in the corresponding BMC, and the corresponding BMC may be further configured to provide full IPMI processing.

In another illustrative, non-limiting embodiment, an IHS may include a plurality of trays, blades, or sleds, each given tray, blade, or sled having a single BMC coupled to two or more of a plurality of nodes, each of the plurality of nodes including a processor, a memory, and an iMC, each of the iMCs coupled to the single BMC, a method comprising: implementing, via each of the plurality of iMCs, a first IPMI stack having a first architecture, the first IPMI architecture configured to communicate sensor information, host interface messages, and serial instructions to the single BMC; and processing the sensor information, host interface messages, and serial instructions by the single BMC, where the single BMC is configured to implement a second IPMI stack having a second architecture, and where the second architecture is logically more complex than the first architecture.

The first architecture may include a sensor driver, a sensor monitor coupled to the sensor driver, and a first encapsulator coupled to the sensor driver. The first encapsulator may include a PLDM-to-management transport protocol mapper, a management transport protocol interface coupled to the PLDM-to-management transport protocol mapper, and an interconnect bus link coupled to the management transport protocol interface. The first architecture may further include a host interface driver, a host interface message relay coupled to the host interface driver, and a second encapsulator coupled to the host interface message relay. The first architecture may further include a UART driver, a serial relay coupled to the UART driver, and a third encapsulator coupled to the serial relay. The second architecture may include a first decapsulator configured to configured to communicate sensor information to or from each iMC, a second decapsulator configured to configured to communicate host interface information to or from each iMC, and a third decapsulator configured to configured to communicate UART information to or from each iMC.

In yet another illustrative, non-limiting embodiment, in an IHS having a plurality of trays, blades, or sleds, each given tray, blade, or sled having a BMC coupled to two or more of a plurality of nodes, each of the plurality of nodes including a processor, a memory, and an iMC, a memory device having program instructions stored thereon that, upon execution, cause the IHS to: implement, via each of the plurality of iMCs, a first IPMI stack having a first architecture, the first IPMI architecture configured to communicate sensor information, host interface messages, and serial instructions to the BMC; and implement, via the BMC, IPMI processing of the sensor information, host interface messages, and serial instructions, wherein the BMC has a second IPMI stack having a second architecture different from the first architecture.

In some cases each of the iMCs may have a smaller footprint that the BMC. The first architecture may include a sensor driver, a sensor monitor coupled to the sensor driver, and a first encapsulator coupled to the sensor driver, the first encapsulator configured to communicate sensor information to or from the BMC; a host interface driver, a host interface message relay coupled to the host interface driver, and a second encapsulator coupled to the host interface message relay, the second encapsulator configured to communicate host interface information to or from the BMC; and an UART driver, a serial relay coupled to the UART driver, and a third encapsulator coupled to the serial relay, the third encapsulator configured to communicate UART information to or from the BMC.

The first encapsulator may include a PLDM-to-MCTP mapper, an MCTP interface coupled to the PLDM-to-MCTP mapper, and an interconnect bus link coupled to the MCTP interface, where the BMC includes a first decapsulator configured to configured to communicate sensor information to or from each iMC, a second decapsulator configured to configured to communicate host interface information to or from each iMC, and a third decapsulator configured to configured to communicate UART information to or from each iMC.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Baseboard management systems and methods with distributed intelligence for multi-node platforms are described. In some embodiments, the systems and methods disclosed herein may implement a distributed Intelligent Platform Management Interface (IPMI) useable to control intelligent devices that monitor an Information Handling System (IHS) such as, for example, a server. Certain servers are equipped with an on-board microcontroller called the baseboard management controller (BMC), which is compliant with the IPMI specification. The IPMI specification defines standardized, abstracted interfaces to the platform management subsystem. The BMC is the heart of the IPMI architecture and provides the intelligence behind intelligent platform management—autonomous monitoring and recovery features implemented directly in platform management hardware and firmware.

IPMI defines a set of common interfaces to the hardware and firmware that is used to monitor system health and manage the system. Because operating, administering, and maintaining servers can represent a significant portion of total cost of ownership, any reduction in these processes through automation can help reduce such costs.

As noted above, high-density, hyper-scale data centers are increasingly incorporating designs that include multiple processors on the same server. The advent of new highly integrated SOC (System-on-Chip) server silicon designs based on licensed processing cores is fueling the introduction of these new architectures—which are often referred to as multi-node servers or micro-servers. For application software, the architecture allows the software to "scale-out" onto more systems with smaller core-count and less single-thread performance; which is a good match for many workloads.

However, since several server instances can be implemented on a single motherboard (or even on a single blade motherboard), the systems management complexity is larger—because there are more "systems" to manage now. Even though each system is smaller, operators expect each system to have similar management capabilities as exist on a large-core/high-performance server or IHS. For hyper scale, these management capabilities include: both host and out-of-band access to IPMI based serial console, Central Processing Unit (CPU) and memory sensors, as well as power control.

A problem with providing baseboard management systems in the aforementioned environments is providing these features without growing cost and/or complexity. Existing solutions to this problem include deploying full IPMI instances in each node—thus requiring multiple higher cost SOCs to support the full IPMI stack and complexity by making system vendors support yet additional IPMI stacks.

To address these, and other problems, the systems and methods described herein provide an architecture and design for efficiently distributing the baseboard management operations across multiple node management circuits and a sled or tray BMC. A management interface may be partitioned between node logic/firmware and tray/sled BMC or chassis level manager firmware in such a way as to lower overall cost and complexity without sacrificing desirable features. In some implementations, these systems and methods may effectively provide a discrete BMC on each node—although a full-featured IPMI stack does not need to be physically replicated in each such node—and then consolidate IPMI operations for all nodes via a low pin-count interface.

In the following detailed description of embodiments of the disclosure, specific embodiments in which the disclosure may be practiced are described in sufficient detail a person of ordinary skill in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments," or "one or more embodiments" are intended to indicate that a particular feature, structure, component, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
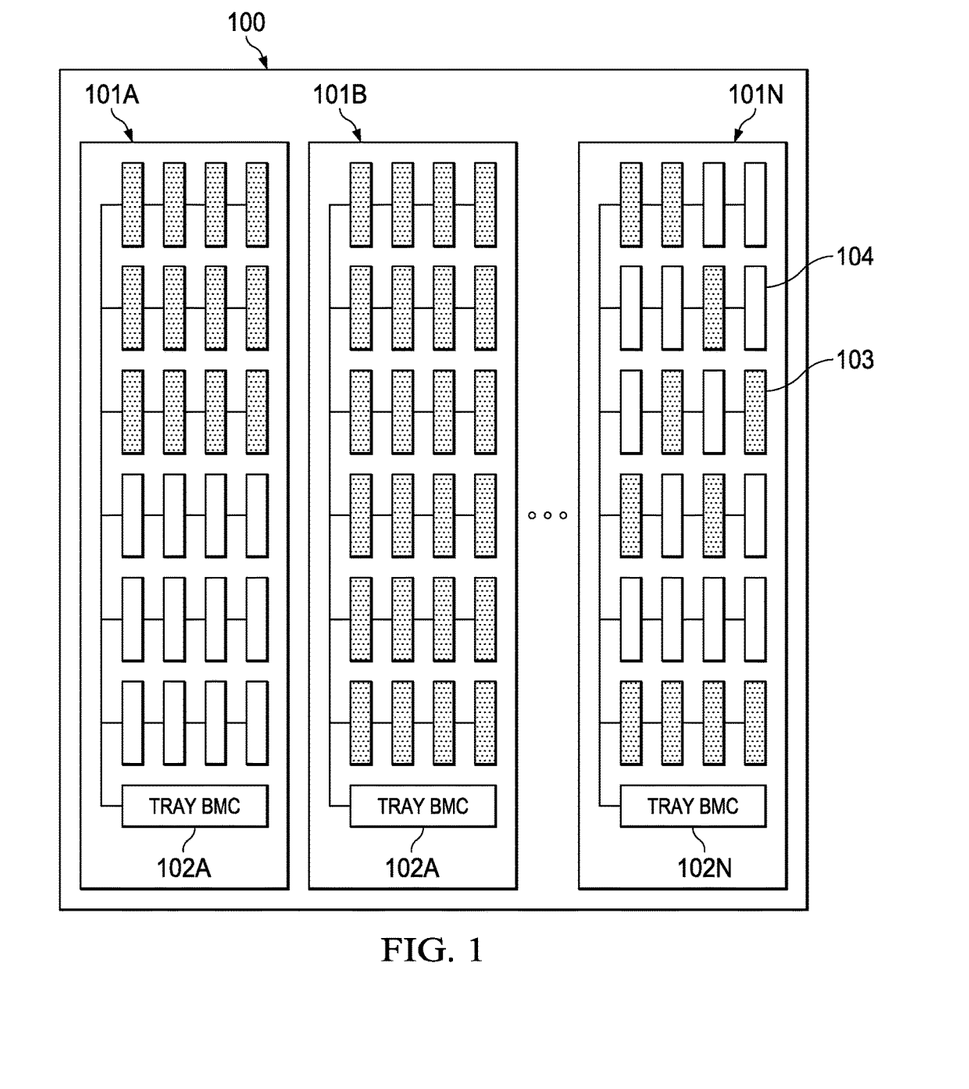
FIG. 1 is a block diagram of an example of an Information Handling System (IHS) design having a plurality of "trays" (modules or baseboards), each tray having a plurality of system-on-chip (SoC) nodes according to some embodiments.

FIG. 1 is a block diagram of an example of an Information Handling System (IHS) design having a plurality of "trays" (modules or baseboards), each tray having a plurality of system-on-chip (SoC) nodes. In some embodiments, tray design 100 may include a plurality of trays 101A-N, each of which may be individually removable from the IHS (not shown). Each of trays 101A-N may have a single "baseboard" that a number of SOC-based server nodes may be plugged into. As illustrated, SOC node 103 is coupled to tray 102N, and empty tray connector or slot 104 is available to receive another SOC node on that same tray. Each of trays 101A-N also has a corresponding consolidation network switch and tray BMCs (or simply "BMCs") 102A-N.

An IHS' chassis having tray design 100 may further include common power module(s) and/or fan(s) to cool the entire chassis. Each tray-level BMC 102A-N may be configured to consolidate information sent to and received from chassis-level sensors, chassis power and fan control, sensors from each of the SOC nodes (e.g., CPU temperature and memory sensors), serial console from each SOC node, host Basic I/O System (BIOS)/software interface from each SOC node, and/or logs from each SOC node. Each one of the SOC nodes on each of trays 101A-N may implement its own integrated management controller (iMC; discussed for example in connection with FIG. 4), which communicates with BMCs 102A-N. Moreover, each of the plurality of IMCs may be configured to implement a first IPMI stack having a simpler architecture than a second IPMI stack implemented by each of BMCs 102A-N, as described in more detail below.

Figure 2:
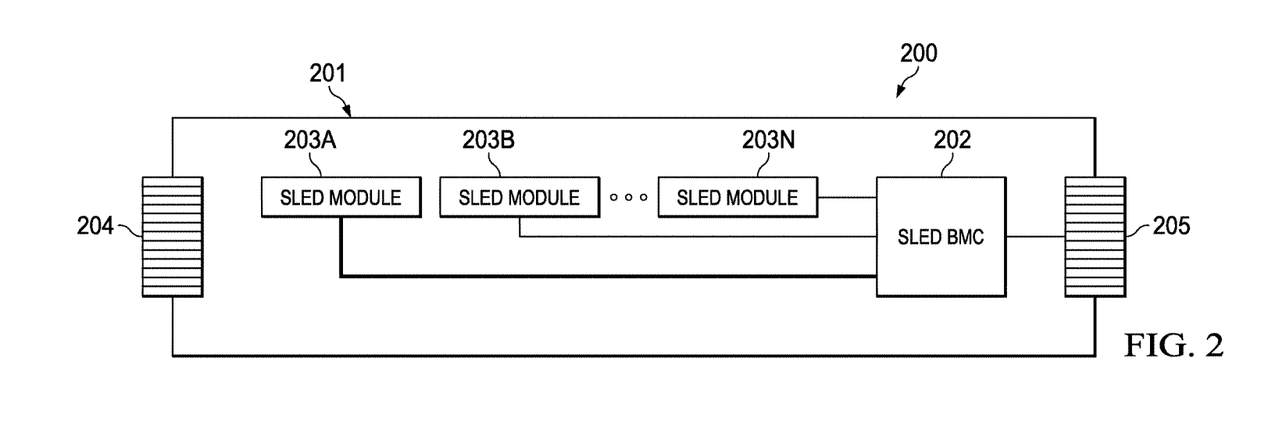
FIG. 2 is a block diagram of an example of IHS sled design having a plurality of "sleds" (modules or baseboards), each sled having a plurality of SoC nodes according to some embodiments.

FIG. 2 is a block diagram of an example of IHS sled design having a plurality of "sleds" (modules or baseboards), each sled having a plurality of SoC nodes. Similarly as illustrated in FIG. 1, single blade 201 (or multi-node chassis sled) may have a plurality of independent SOC-based systems or nodes 203A-N. Each one of the SOC-based systems or nodes 203A-N may implement its own iMC with a reduced IPMI stack, whereas Blade/sled-level BMC 202 (or simply "BMC") provides management consolidation and full IPMI processing for all of modules 203A-N in sled 201. Sled 200 may also include midplane connector 204 and faceplate connector 205 to connect sled 200 to an IHS midplane and/or IHS faceplate, respectively.

It should be noted that, in alternative embodiments, two or more of BMCs that would typically be assigned to different trays or sleds may instead be associated with two or more trays or sleds, or the entire IHS chassis ("chassis BMC").

Figure 3:
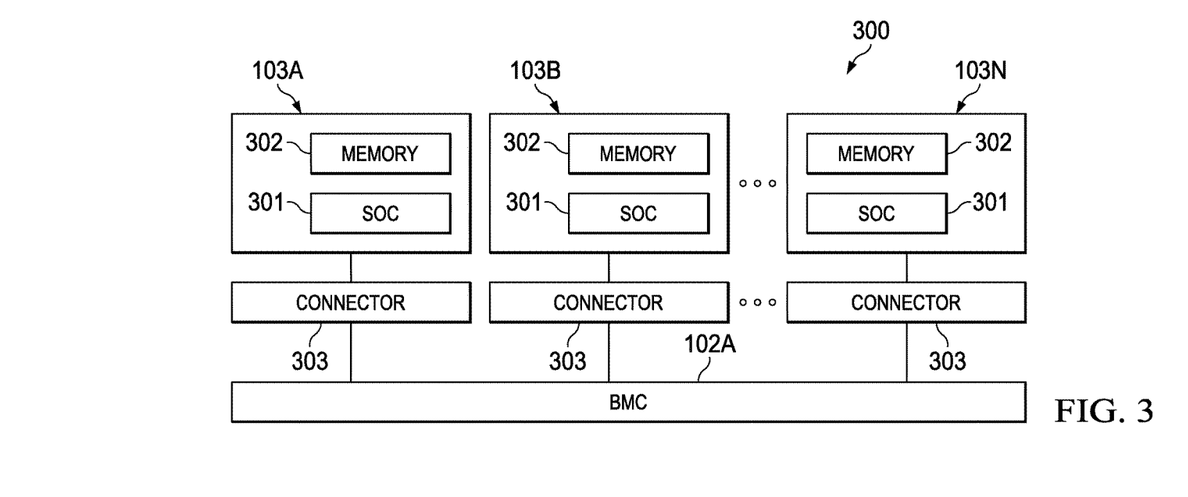
FIG. 3 is a block diagram of an example of tray or sled components according to some embodiments.

FIG. 3 is a block diagram of an example of tray or sled components 300. As illustrated, each of SOC nodes 103A-N of tray 101A includes SOC logic 301 and memory 302. Connector 303 provides communications between each of nodes 203A-N and BMC 102A. As noted above, in some embodiments SOC logic 301 may implement iMC with a reduced IPMI stack while BMC 102A implements more advanced or sophisticated IPMI operations (e.g., a full IPMI stack).

Figure 4:
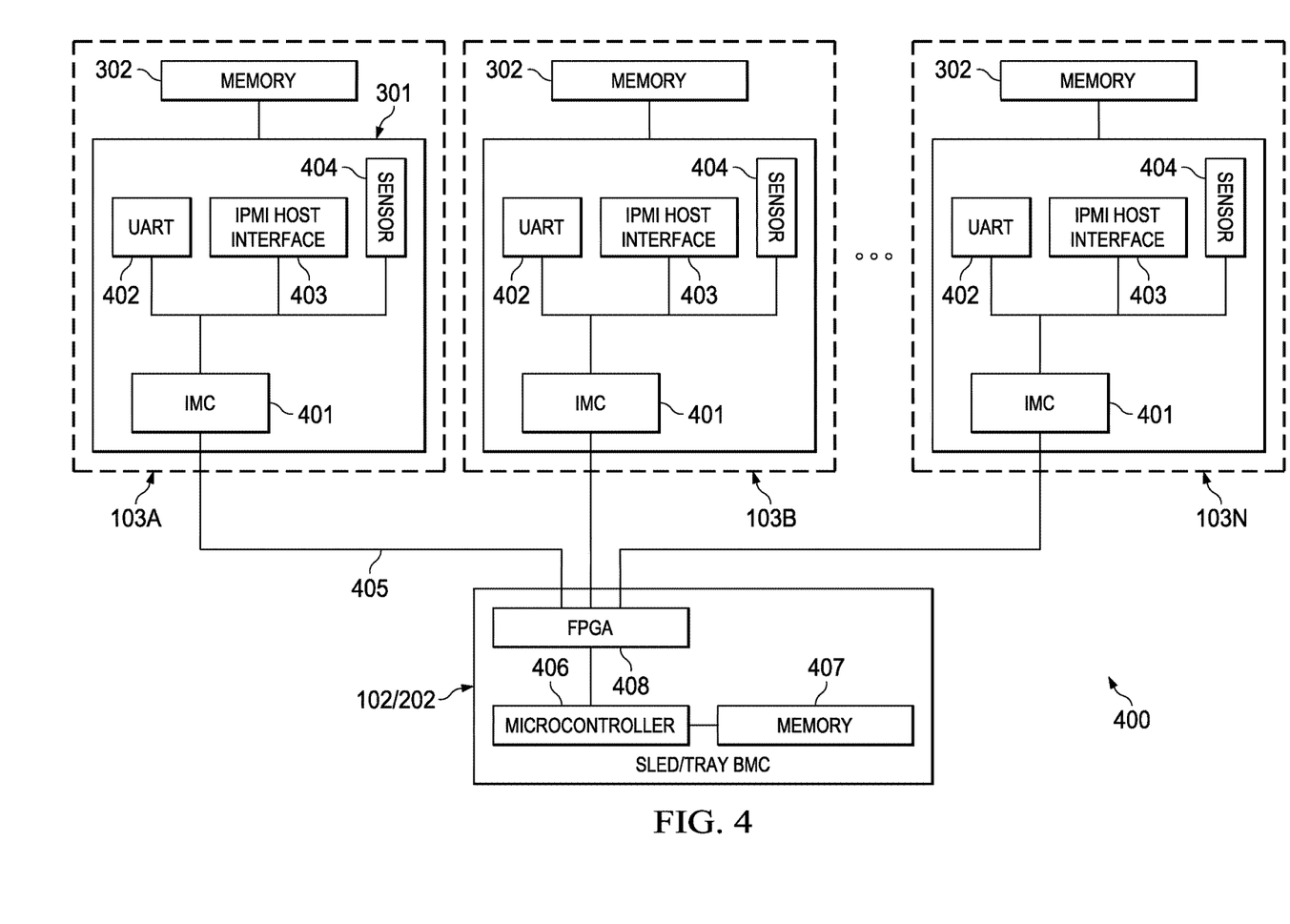
FIG. 4 is a block diagram of an example of a distributed baseboard management system according to some embodiments.

FIG. 4 is a block diagram of an example of a distributed baseboard management system 400. As previously shown in FIG. 3, here SOC 103A also includes SOC logic 301 and memory 302. SOC logic includes iMC microcontroller 401, universal asynchronous receiver/transmitter (UART) interface 402, IPMI host interface 403, and sensor interface 404. Meanwhile, BMC 102/202 includes BMC microcontroller 406, memory 407, and field-programmable gate array (FPGA) 408. iMC 103A and BMC 102/202 are coupled to each other via interconnect bus 405.

In some embodiments, host node 103A has simpler logic implemented without adding significant costs and integrated in the SOC. For instance, iMC 401 may include any management hardware interfaces that BIOS and Operating System (OS) software expects to find, including, for example, a serial console UART, IPMI Host Interface instances for both BIOS and OS (e.g., Keyboard Controller Style (KCS) interface), as well as access to node-level sensors (e.g., CPU temperature, CPU health, memory temperature, memory health, etc). iMC 401 may include a small node-level micro-controller that interfaces the node management logic provided by components 402-404 via a management interconnect that coupled that logic with BMC 102/202 and/or a chassis level manager.

The cost of each iMC 401 is relatively small compared to the cost of BMC 102/202 because the functionality and amount memory needed by each iMC is relatively small compared to a more full-featured BMC. In some cases, iMC 401 may be configured to: (a) read outgoing data from node UART 402 and host Interface 403, packetize it and send it out the management interconnect (e.g., without much or any processing); (b) read incoming data on the management interconnect, and write to UART 402 and host interface 403 (e.g., without much or any processing); and (c) scan internal SOC hardware logic and implement a relatively simple but intelligent sensor interface that BMC 102/202 or the chassis level manager can use to read SOC sensors 404.

On the other hand, BMC 102/202 may be configured to implement the consolidating management control for the entire sled, tray, or chassis, at least in part, through the use of a suitable management transport protocol, such as, for example, the Distributed Management Task Force (DMTF) Management Component Transport Protocol (MCTP) standard. This may include, for instance, implementing an interface to the Management Interconnect for each node by FPGA 408; but may alternatively use any other suitable aggregation logic or circuit.

A more full-featured BMC-class microcontroller 406 with sufficient memory and CPU performance to run multiple instances of the IPMI stack (one for each node), provide external facing command-line and GUI interfaces, and provide network/security protocols. In operation, this Sled/Tray BMC 102/202 may be configured to: (a) run multiple copies of the IPMI stack (one for each of nodes 103A-N), getting data from each node iMC that provides encapsulation and decapsulation of MCTP packets; (b) provide IPMI processing, data formatting, logging, state machines, event filtering, and external interfaces (including serial over LAN) associated with IPMI such as Sensor Read/Write, System Event Log (SEL) logging (with sensor capabilities abstracted from iMC), Sensor Data Record (SDR) functionality, sled/tray/chassis-level field replaceable unit (FRU) management, Platform Event Filtering, Serial Over Local Area Network (LAN; with serial data abstracted from iMC), IPMI over LAN and IPMI command processing; (c) scan and implement tray/sled/chassis level monitoring and control, and logging, and integrate with the IPMI node views; and (d) implement an additional non-IPMI command-line and/or graphical user interface (GUI).

Figure 5:
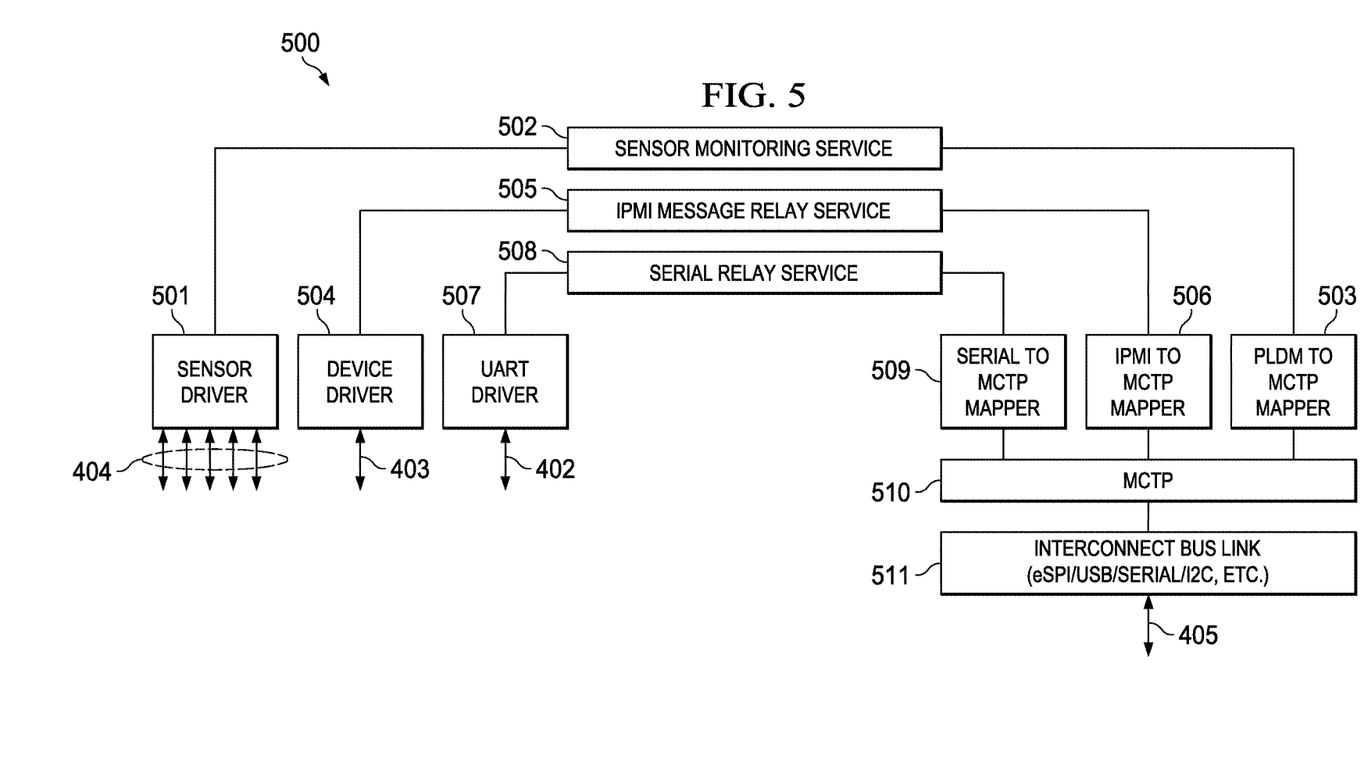
FIG. 5 is a block diagram of an architectural example of an integrated management controller (iMC) according to some embodiments.

FIG. 5 is a block diagram of an architectural example of iMC 500 according to some embodiments. As shown, sensor driver 501 is in communication with sensor interface 404 and sensor monitoring service 502, which in turn is coupled to Platform Level Data Model (PLDM) to management transport protocol mapper 503 (e.g., an MCTP mapper). Host interface device driver 503 (e.g., a KCS device driver, etc.) is in communication with IPMI host interface 403 and IPMI host interface message relay service 505 (e.g., a KCS message relay service, etc.), which in turn is coupled to IPMI-to-management transport protocol mapper 506 (e.g., an IPMI to MCTP mapper, etc.). UART driver 507 is in communication with UART interface 403 and with serial relay service 508, which in turn is coupled to serial-to-management transport protocol mapper 509 (e.g. a serial-to-MCTP mapper, etc.). Each of PLDM-to-MCTP mapper 503, IPMI-to-MCTP mapper 506, and serial-to-MCTP mapper 509 is coupled to MCTP interface 510, which in turn is coupled to interconnect bus link 511.

The interconnect shown in FIG. 5 may couple all of the node management logic 501-511 to the sled/tray/chassis BMC 600 discussed in connection with FIG. 6 below. For example, in some cases, interconnect bus link 511 may be coupled to bus 405 and it may be implemented using the Enhanced Serial Peripheral Interface (eSPI) specification, Inter-Integrated Circuit (I²C) bus, Universal Serial Bus (USB), or Ethernet links. Also, interconnect bus link 511 may have a small pin count so that it may be run through connectors (e.g., midplane connector 204), without causing the BMC pin-count to be high.

iMC architecture 500 may be designed as a less-featured software stack an iMC 500 is capable of driving to capture and encapsulate data. For instance, in various embodiments, iMC architecture 500 may be configured to: (a) read/write data from/to UART 402 and Host Interface 403; (b) read/write data to/from management interconnect bus 405; (c) provide an abstracted view of node sensors 404 so that a tray/sled/chassis-level BMC can read the sensors (that is, iMC 500 does not perform heavy processing or interpreting of data—but only packaging and moving); (d) and relay data to mappers 503, 506, and 509 that wrap or encapsulate the data into standard management transport packets. Payload types are transported via MCTP interface 510, which is a very lightweight, efficient wrapper protocol that allows payloads to be moved across various interconnects.

Figure 6:
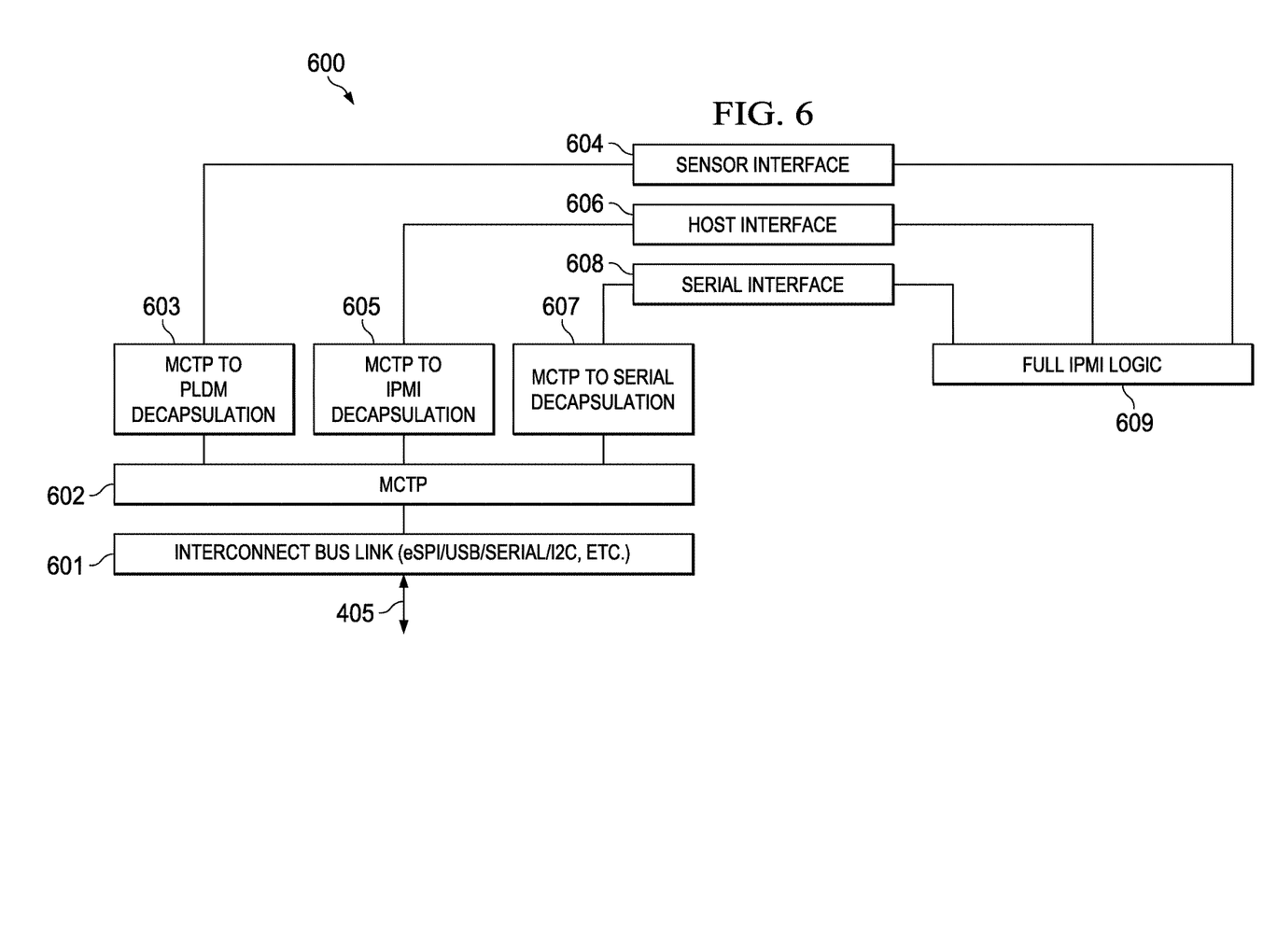
FIG. 6 is a block diagram of an architectural example of a baseboard management controller (BMC) according to some embodiments.

FIG. 6 is a block diagram of an architectural example of BMC 600 according to some embodiments. Particularly, BMC architecture 600 includes interconnect bus link 601 coupled to bus 405 (e.g., eSPI, I²C, USB, Ethernet, etc.), MCTP interface 602, MCTP-to-PLDM decapsulator 603, MCTP-to-IPMI decapsulator 605, and MCTP-to-Serial decapsulator 607. MTCP decapsulators 603, 605, and 607 are coupled to sensor interface 604, host interface 606 (e.g., a KCS interface), and serial interface 608, respectively. Interfaces 604, 606, and 608 are coupled to IPMI logic 609, which in some cases may implement a full-featured IPMI circuit and/or instructions.

In operation, IPMI logic 609 may create a corresponding IPMI instance for each iMC that is being serviced by BMC architecture 600, which contains the transport logic for application handling. IPMI logic 609 reads MCTP packets from the bus and routes them to appropriate instances for application level servicing. Also, IPMI logic 609 writes transport data from applications to the interconnect bus after MCTP encapsulation. Accordingly, the heavy lift operations are contained at the sled/tray/chassis BMC level, as opposed the iMC level.

Figure 7:
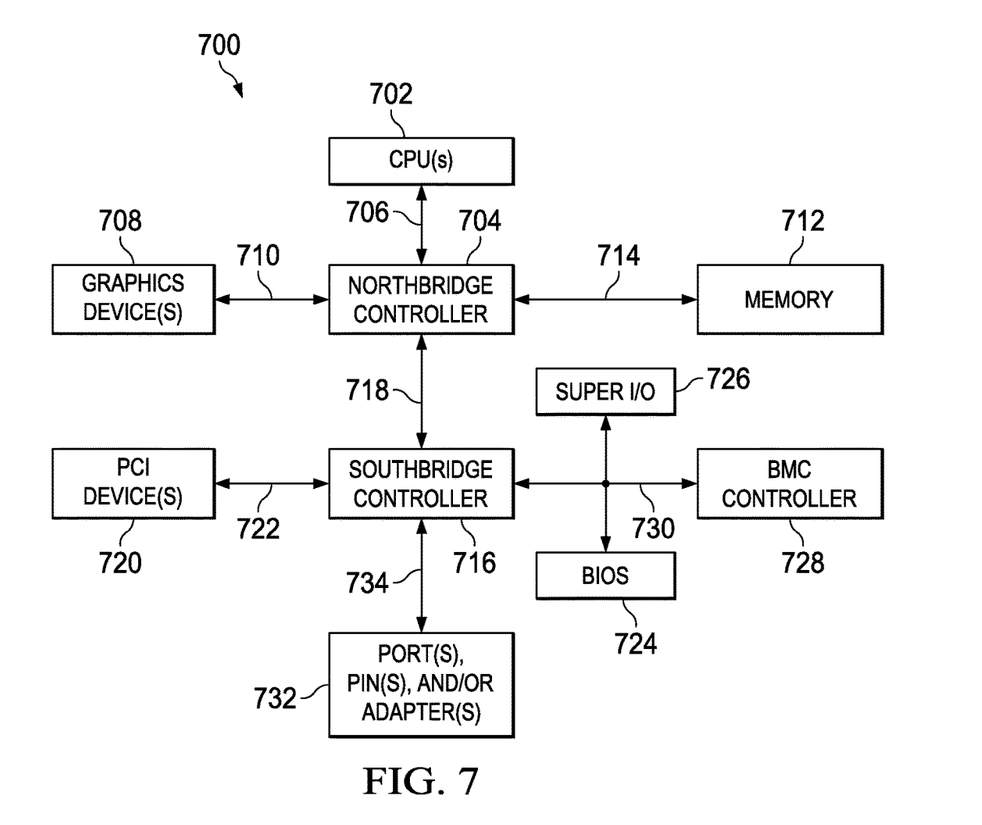
FIG. 7 is a block diagram illustrating an example of an Information Handling System (IHS) configured to implement according to some embodiments.

FIG. 7 is a block diagram illustrating an example of an IHS configured to perform baseboard management with distributed intelligence in multi-node platforms according to some embodiments. For example, in some cases, tray IHS design 100 or sled IHS design 200 may be implemented within IHS 700. As shown, IHS 700 includes one or more CPUs 702. In various embodiments, IHS 700 may be a single-processor system including one CPU 702, or a multi-processor system including two or more CPUs 702 (e.g., two, four, eight, or any other suitable number). CPU(s) 702 may include any processor capable of executing program instructions. For example, in various embodiments, CPU(s) 702 may be general-purpose or embedded processors implementing any of a variety of instruction set architectures (ISAs), such as the x86, POWERPC®, ARM®, SPARC®, or MIPS® ISAs, or any other suitable ISA. In multiprocessor systems, each of CPU(s) 702 may commonly, but not necessarily, implement the same ISA. In an embodiment, a motherboard configured to provide structural support, power, and electrical connectivity between the various aforementioned components. Such a motherboard may include multiple connector sockets in various configurations, adapted to receive pluggable circuit cards, component chip packages, etc.

CPU(s) 702 are coupled to northbridge controller or chipset 704 via front-side bus 706. Northbridge controller 704 may be configured to coordinate I/O traffic between CPU(s) 702 and other components. For example, in this particular implementation, northbridge controller 704 is coupled to graphics device(s) 708 (e.g., one or more video cards or adaptors, etc.) via graphics bus 710 (e.g., an Accelerated Graphics Port or AGP bus, a Peripheral Component Interconnect or PCI bus, etc.). Northbridge controller 704 is also coupled to system memory 712 via memory bus 714. Memory 712 may be configured to store program instructions and/or data accessible by CPU(s) 702. In various embodiments, memory 712 may be implemented using any suitable memory technology, such as static RAM (SRAM), synchronous dynamic RAM (SDRAM), nonvolatile/Flash-type memory, or any other type of memory.

Northbridge controller 704 is coupled to southbridge controller or chipset 716 via internal bus 718. Generally, southbridge controller 716 may be configured to handle various of computing device 700's I/O operations, and it may provide interfaces such as, for instance, Universal Serial Bus (USB), audio, serial, parallel, Ethernet, etc., via port(s), pin(s), and/or adapter(s) 732 over bus 734. For example, southbridge controller 716 may be configured to allow data to be exchanged between computing device 700 and other devices, such as other IHSs attached to a network. In various embodiments, southbridge controller 716 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 716 may also enable connection to one or more keyboards, keypads, touch screens, scanning devices, voice or optical recognition devices, or any other devices suitable for entering or retrieving data. Multiple I/O devices may be present in computing device 700. In some embodiments, I/O devices may be separate from IHS 700 and may interact with IHS 700 through a wired or wireless connection. As shown, southbridge controller 716 is further coupled to one or more PCI devices 720 (e.g., modems, network cards, sound cards, video cards, etc.) via PCI bus 732. Southbridge controller 716 is also coupled to BIOS 724, Super I/O Controller 726, and BMC 728 via Low Pin Count (LPC) bus 270. In some cases, BMC 728 may be used as one of tray BMCs 102A-N, sled BMCs 202, or a chassis BMC.

BIOS 724 includes non-volatile memory having program instructions stored thereon. Those instructions may be usable CPU(s) 702 to initialize and test other hardware components and/or to load an Operating System (OS) onto computing device 700. As such, BIOS 724 may include a firmware interface that allows CPU(s) 702 to load and execute certain firmware, as described in more detail below. In some cases, such firmware may include program code that is compatible with the Unified Extensible Firmware Interface (UEFI) specification, although other types of firmware may be used.

BMC controller 728 may include non-volatile memory having program instructions stored thereon that are usable by CPU(s) 702 to enable remote management of IHS 700. For example, BMC controller 728 may enable a user to discover, configure, and manage BMC controller 728, setup configuration options, resolve and administer hardware or software problems, etc. Additionally or alternatively, BMC controller 728 may include one or more firmware volumes, each volume having one or more firmware files used by the BIOS' firmware interface to initialize and test components of computing device 700.

Super I/O Controller 726 combines interfaces for a variety of lower bandwidth or low data rate devices. Those devices may include, for example, floppy disks, parallel ports, keyboard and mouse, temperature sensor and fan speed monitoring, etc. For example, the super I/O controller 726 may be coupled to the one or more upstream sensors 706 and to the one or more downstream sensors 708.

In some cases, IHS 700 may be configured to access different types of computer-accessible media separate from memory 712. Generally speaking, a computer-accessible memory device may include any tangible, non-transitory storage media or memory media such as electronic, magnetic, or optical media—e.g., magnetic disk, a hard drive, a CD/DVD-ROM, a Flash memory, etc.—coupled to IHS 700 via northbridge controller 704 and/or southbridge controller 716.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 700 is merely illustrative and is not intended to limit the scope of the disclosure described herein. In particular, any computer system and/or device may include any combination of hardware or software capable of performing certain operations described herein. For instance, although IHS 700 is illustrated following an Intel® architecture, various systems and methods described herein may be adapted to work with any other chipset and/or BMC configuration.

In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 704 may be combined with southbridge controller 716, and/or be at least partially incorporated into CPU(s) 702. In other implementations, one or more of the devices or components shown in FIG. 7 may be absent, or one or more other components may be added. Accordingly, systems and methods described herein may be implemented or executed with other computer system configurations. In some cases, various elements shown in FIG. 7 may be enclosed within a chassis or the like.

A person of ordinary skill in the art will recognize that IHS 700 of FIG. 7 is only an example of a system in which the present embodiments may be utilized. Indeed, the present embodiments may be used in various other types of electronic devices.

In some embodiments, the baseboard management systems and methods with distributed intelligence for multi-node platforms described herein may provide simplicity of node management logic (via iMCs) without a heavy IPMI stack that SOC vendors have to buy or license from third parties, but rather with a simple stack that is easy to define, easy to implement, with small silicon footprint and internal SOC RAM, without adding significant costs to the SOC. The systems and methods may also provide increase flexibility by putting the entire complex IPMI stack and all user interfaces in a consolidated tray/sled BMC or chassis level manager, which has plenty of RAM, FLASH, performance, and can leverage platform vendor implementations—all of which make the overall solution less complex. Moreover, host software on each SOC node and the remote software executed by the tray/sled/chassis BMC may each run tools that are indifferent to the merging of service traffic as MCTP over various physical interfaces.

As such, these systems and methods avoid problems that would otherwise arise if a full BMC were implemented on all nodes, and a separate, consolidation BMC is used to manage all full-features node BMCs, including, by not limited to: added costs to SOCs by increasing internal RAM size significantly, added complexity due to forcing vendors to integrate IPMI in their SOCs, added operator complexity by forcing direct management of all BMCs. Additionally or alternatively, these systems and methods overcome other problems that would surface if existing hardware interfaces were run from each of a plurality of SOCs to a single BMC, including, but not limited to, large pin counts that are not feasible for designs with many nodes behind one consolidating BMC, where interconnects pass through connectors. Additionally or alternatively, these systems and methods avoid problems that would otherwise arise if only partial management functionality, including, but not limited to, the lack of host interfaces and/or serial consoles. (e.g., no host interfaces).

In the above described flowcharts, one or more of the methods may be embodied in a memory device or computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by a person of ordinary skill in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable a person of ordinary skill in the art to understand the disclosure for various embodiments with various modifications as are suited to the particular use contemplated.

The invention claimed is:

1. An Information Handling System (IHS), comprising:
a plurality of modules, each of the plurality of modules including a plurality of nodes, each of the plurality of nodes including a system-on-chip (SoC), each of the plurality of SoCs including an integrated management controller (iMC), each of the plurality of iMCs configured to implement a first intelligent platform management interface (IPMI) stack having a first architecture; and
a plurality of baseboard management controllers (BMCs), each of the BMCs disposed on a corresponding one of the plurality of modules, each of the BMCs coupled to the plurality of iMCs on the corresponding one of the plurality of modules, each of the plurality of iMCs configured to implement a second IPMI stack having a second architecture different from the first architecture.

2. The IHS of claim 1, wherein the plurality of modules includes trays, blades, or sleds, and wherein the IHS further comprises a chassis configured to receive the trays, blades, or sleds.

3. The IHS of claim 1, wherein each of the plurality of SoCs include a processor and a memory coupled to the processor.

4. The IHS of claim 1, wherein the first architecture has a smaller number of components than the second architecture.

5. The IHS of claim 1, wherein the first architecture includes a sensor driver, a sensor monitor coupled to the sensor driver, and a first encapsulator coupled to the sensor driver, the first encapsulator configured to communicate sensor information to or from a corresponding BMC.

6. The IHS of claim 5, wherein the first encapsulator includes a Platform Level Data Model (PLDM)-to-management transport protocol mapper, a management transport protocol interface coupled to the PLDM-to-management transport protocol mapper, and an interconnect bus link coupled to the management transport protocol interface; and wherein the interconnect bus link is configured to communicate with the corresponding BMC.

7. The IHS of claim 5, wherein the first architecture further includes a host interface driver, a host interface message relay coupled to the host interface driver, and a second encapsulator coupled to the host interface message relay, the second encapsulator configured to communicate host interface information to or from the corresponding BMC.

8. The IHS of claim 7, wherein the first architecture further includes a universal asynchronous receiver/transmitter (UART) driver, a serial relay coupled to the UART driver, and a third encapsulator coupled to the serial relay, the third encapsulator configured to communicate UART information to or from the corresponding BMC.

9. The IHS of claim 8, wherein the corresponding BMC includes a first decapsulator configured to configured to communicate sensor information to or from the iMC, a second decapsulator configured to configured to communicate host interface information to or from the iMC, and a third decapsulator configured to configured to communicate UART information to or from the iMC.

10. The IHS of claim 9, wherein the first, second, and third decapsutators are each coupled to respective interfaces in the corresponding BMC, the corresponding BMC further configured to provide full IPMI processing.

11. In an Information Handling System (IHS) having a plurality of trays, blades, or sleds, each given tray, blade, or sled having a single baseboard management controller (BMC) coupled to two or more of a plurality of nodes, each of the plurality of nodes including a processor, a memory, and an integrated management controller (iMC), each of the iMCs coupled to the single BMC, a method comprising:
implementing, via each of the plurality of iMCs, a first intelligent platform management interface (IPMI) stack having a first architecture, the first IPMI architecture configured to communicate sensor information, host interface messages, and serial instructions to the single BMC; and
processing the sensor information, host interface messages, and serial instructions by the single BMC, wherein the single BMC is configured to implement a second IPMI stack having a second architecture, and wherein the second architecture is logically more complex than the first architecture.

12. The method of claim 11, wherein the first architecture includes a sensor driver, a sensor monitor coupled to the sensor driver, and a first encapsulator coupled to the sensor driver.

13. The method of claim 12, wherein the first encapsulator includes a Platform Level Data Model (PLDM)-to-management transport protocol mapper, a management transport protocol interface coupled to the PLDM-to-management transport protocol mapper, and an interconnect bus link coupled to the management transport protocol interface.

14. The method of claim 12, wherein the first architecture further includes a host interface driver, a host interface message relay coupled to the host interface driver, and a second encapsulator coupled to the host interface message relay.

15. The method of claim 14, wherein the first architecture further includes a universal asynchronous receiver/transmitter (UART) driver, a serial relay coupled to the UART driver, and a third encapsulator coupled to the serial relay.

16. The method of claim 11, wherein the second architecture includes a first decapsulator configured to configured to communicate sensor information to or from each iMC, a second decapsulator configured to configured to communicate host interface information to or from each iMC, and a third decapsulator configured to configured to communicate UART information to or from each iMC.

17. In an Information Handling System (IHS) having a plurality of trays, blades, or sleds, each given tray, blade, or sled having a baseboard management controller (BMC) coupled to two or more of a plurality of nodes, each of the plurality of nodes including a processor, a memory, and an integrated management controller (iMC), a memory device having program instructions stored thereon that, upon execution, cause the IHS to:

implement, via each of the plurality of iMCs, a first intelligent platform management interface (IPMI) stack having a first architecture, the first IPMI architecture configured to communicate sensor information, host interface messages, and serial instructions to the BMC; and implement, via the BMC, IPMI processing of the sensor information, host interface messages, and serial instructions, wherein the BMC has a second IPMI stack having a second architecture different from the first architecture.

18. The memory device of claim 17, wherein each of the iMCs has a smaller footprint that the BMC.

19. The memory device of claim 17, wherein the first architecture includes:

a sensor driver, a sensor monitor coupled to the sensor driver, and a first encapsulator coupled to the sensor driver, the first encapsulator configured to communicate sensor information to or from the BMC;

a host interface driver, a host interface message relay coupled to the host interface driver, and a second encapsulator coupled to the host interface message relay, the second encapsulator configured to communicate host interface information to or from the BMC; and a universal asynchronous receiver/transmitter (UART) driver, a serial relay coupled to the UART driver, and a third encapsulator coupled to the serial relay, the third encapsulator configured to communicate UART information to or from the BMC.

20. The memory device of claim 19, wherein the first encapsulator includes a Platform Level Data Model (PLDM)-to-Management Component Transport Protocol (MCTP) mapper, an MCTP interface coupled to the PLDM-to-MCTP mapper, and an interconnect bus link coupled to the MCTP interface, and wherein the BMC includes a first decapsulator configured to configured to communicate sensor information to or from each iMC, a second decapsulator configured to configured to communicate host interface information to or from each iMC, and a third decapsulator configured to configured to communicate UART information to or from each iMC.

* * * * *

UNITED STATES PATENT AND TRADEMARK OFFICE
CERTIFICATE OF CORRECTION

PATENT NO. : 9,767,067 B2  
APPLICATION NO. : 14/625676  
DATED : September 19, 2017  
INVENTOR(S) : Rao et al.

Page 1 of 1

It is certified that error appears in the above-identified patent and that said Letters Patent is hereby corrected as shown below:

In the Claims

In Column 14, Line 8, Claim 9, delete the first occurrence of "configured to".
In Column 14, Line 10, Claim 9, delete the first occurrence of "configured to".
In Column 14, Line 12, Claim 9, delete the first occurrence of "configured to".

In Column 14, Line 57, Claim 16, delete the first occurrence of "configured to".
In Column 14, Line 59, Claim 16, delete the first occurrence of "configured to".
In Column 14, Line 61, Claim 16, delete the first occurrence of "configured to".

In Column 16, Line 16, Claim 20, delete the first occurrence of "configured to".
In Column 16, Line 18, Claim 20, delete the first occurrence of "configured to".
In Column 16, Line 21, Claim 20, delete the first occurrence of "configured to".

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*